United States Patent Office 3,553,114
Patented Jan. 5, 1971

3,553,114
METHOD OF COATING A DELIQUESCENT SUBSTANCE ONTO THE SURFACE OF FOAMABLE BEADS AND FOAMING THE BEADS; THE FOAMABLE AND FOAMED PRODUCTS OBTAINED THEREFROM
Patrick Vivian Burt, Newport, England, assignor to Monsanto Chemicals Limited, London, England, a British company
No Drawing. Filed Nov. 29, 1967, Ser. No. 686,734
Claims priority, application Great Britain, Nov. 30, 1966, 53,681/66
Int. Cl. B44d 1/092; B26d 7/10; C08j 1/26
U.S. Cl. 260—2.5
7 Claims

ABSTRACT OF THE DISCLOSURE

This invention relates to foamable resins and in particular to particles of foamable vinylaromatic polymers which when foamed and cut by hot wire technique exhibit improved cut surfaces due to a coating of a deliquescent substance on the foamable particles.

BACKGROUND OF THE INVENTION

Foamable vinylaromatic polymers such as for instance foamable polystyrene are an important industrial commodity, and foamable polystyrene particles (for example containing a volatile blowing agent) are commonly used in the production of foamed polystyrene by a process in which they are expanded by the action of heat so as to produce a "prefoam" of foamed beads which are subsequently heated by steam in a suitable mold; here further expansion and consolidation of the foamed beads takes place and an article conforming to the shape of the mold is produced. This practice is well-established, but it has been found more convenient in some instances, for example in the production of ceiling tiles, to produce foamed articles by first molding a large block of foamed polystyrene and subsequently cutting the block into the shape of the articles required using a hot-wire technique. (By a "hot-wire technique" is meant one in which the foamed resin is cut by means of a wire that is heated, usually by the passage of an electric current, to a temperature high enough to melt the foamed resin.) The process of producing hot-wire-cut articles works well in principle, but there have been difficulties caused by variations in the surface appearance of the articles produced. It is for example normally considered desirable for the interfaces between the individual foamed beads to appear in the cut surface as raised peripheries since this gives a decorative appearance, but such raised peripheries are sometimes not present over the whole of the cut surface so that a non-uniform appearance is presented and the article has to be rejected. There have now been developed certain new foamable resin particles which can be used in the production of foamed resins that represent a considerable improvement in this respect.

SUMMARY

The foamable resin particles of the invention comprise a vinylaromatic polymer and a volatile blowing agent, the particles having a coating comprising a deliquescent substance.

The process of the invention is one for the production of a foamed vinylaromatic polymer resin having a good degree of uniformity of appearance when cut by a hot-wire technique, which comprises preparing a prefoam of foamed beads by heating foamable resin particles according to the invention, and treating the prefoam with steam in a mold to produce the foamed resin.

Also part of the invention is a foamed resin having a good degree of uniformity of appearance when cut by a hot-wire technique, which comprises a multiplicity of consolidated foamed vinylaromatic polymer resin beads, having at their interfaces a coating comprising a deliquescent substance.

DESCRIPTION

Particularly valuable results are obtained when the vinylaromatic polymer is polystyrene itself, but it can be for instance a rubber modified or otherwise toughened polystyrene; a polymer of a substituted styrene, such as a methylstyrene, or a copolymer of styrene with a minor proportion (such as 10% or 20% by weight) of an ethylenically unsaturated monomer, for instance an acrylate (such as methyl methacrylate), acrylonitrile or butadiene.

The volatile blowing agent is preferably a hydrocarbon blowing agent or some other volatile substance that swells but does not dissolve the vinylaromatic polymer. A hydrocarbon blowing agent can be gaseous or a liquid under normal conditions of temperature and pressure and can for instance be a butane or a pentane. Preferably it is essentially a pentane fraction. Usually up to about 10% of a blowing agent by weight of the polymer is present, for instance from 3 to 10%.

The deliquescent substance is a substance, preferably a salt, that is capable of absorbing sufficient water from the atmosphere to form a solution therewith. Preferably it combines chemically with water, for example to form a hydrate containing water of crystallisation, and substances that form hydrates containing three or more molar proportions of water are especially preferred. Many substances are deliquescent, but a preferred class comprises deliquescent metal salts, particularly of mineral acids. Preferably the substance chosen is substantially non-toxic and colourless, and there should be borne in mind the need for avoiding corrosion, for instance by acidic, alkaline or electrolytic attack, of any parts of the prefoaming or molding apparatus that may be susceptible to such corrosion. Specific examples of deliquescent substances belonging to this preferred class are calcium chloride, calcium bromide, calcium acetate, potassium carbonate and magnesium chloride, while further examples of deliquescent substances that can be used in appropriate circumstances are orthophosphoric acid, ferric chloride, and sodium or potassium hydroxide, although the toxic and possibly corrosive nature of these last substances needs to be considered before deciding to use them. Calcium chloride has given excellent results.

The amount of the deliquescent substance is preferably not more than 3% by weight of the polymer, for instance from 0.01 to 0.2% or more preferably from 0.2 to 0.1% by weight for particles of average diameter 0.040 inch. Small particles normally need more of the substance by weight than larger ones, because of their greater surface area.

The deliquescent substance can be coated on the particles in any convenient way; for example particles of the foamable polymer can be tumbled with an appropriate quantity of the substance or treated with a solution of the substance so that a surface coating is applied. Water or a mixture of water and ethanol can for example be used as a solvent for this purpose.

Where the deliquescent substance is a powder, its retention on the surface of the particles can be assisted by means of a suitable adhesive substance such as for instance, a viscous liquid or a low-melting solid. Suitable adhesive substances are those that do not have an adverse effect on conversion of the particles to foamed resin; for example some substances that would otherwise be suitable adhesives can cause the particles of prefoam to stick together in clusters and jam the prefoaming and subsequent handling apparatus, while others can interfere with proper consolidation of the prefoam during the molding step so that the foamed resin lacks strength. Examples of suitable adhesive substances include oils such as for instance a mineral oil, waxes such as for instance paraffin wax, and film-forming polymer latices such as for instance a latex of a natural or synthetic rubber of polystyrene or of a styrene-butadiene copolymer resin. A preferred class of adhesive substances, however, are those that also have the property of inhibiting cluster formation at the prefoaming stage. Examples of such substances are the mono-esters of sorbitol or sorbitan such as for instance the mono-laurate, mono-palmitate, mono-stearate and tri-oleate. Sorbitan mono-palmitate is particularly useful. Other useful adhesive substances of the preferred class include amides of $C_{12}$ to $C_{20}$ fatty acids, such as for example oleamide or ricinoleamide. If an adhesive is used this can be applied together with the deliquescent substance but preferably it is applied afterwards. Where the adhesive substance is a viscous liquid, its application to the particles is assisted if its viscosity is reduced for example to less than 500 centipoises at 25° C., by mixing it with a small amount of an appropriate organic liquid, which can be an alcohol such as methanol, ethanol or isopropanol, or a hydrocarbon such as pentane or hexane; for example where the blowing agent is a volatile liquid a little of it can be used for this purpose. A mixture of solvents can be employed. In general, an amount from 50% to 250% by weight of an adhesive substance, based on the weight of deliquescent substance, is effective; preferably the amount is between 75 and 150% by weight, such as for example about 100% by weight.

Foaming and molding operations that are carried out on the foamable particles can follow ordinary practice; thus the foamable particles can for example be heated by steam, hot water or hot air, or under the influence of an infra-red heater, to produce foamed beads, and these are preferably conditioned by exposing them to the atmosphere for a day or two before they are used in the molding operation. A suitable mold can then for instance be fully or partially filled with the prefoam of foamed beads and closed, and steam is injected through inlets in the mold walls so that further expansion and consolidation of the foamed beads takes place. When foaming is complete, the steam supply is shut off and the resulting foamed resin is allowed to cool before the mold is opened. Other methods of molding can also be employed.

Cutting of the foamed resin can conform to established practice of hot-wire technique. Preferably cutting takes place from 12 to 48 hours after molding. Preferably the wire is moved though the foamed resin at a constant speed since this assists in the production of a cut surface having a uniform appearance.

The foamed resin of the invention is particularly useful in the production of tiles, but other articles such as for instance foamed resin sheets, boards or thin flexible veneer can be made with a uniformly decorative appearance by means of a hot-wire cutting technique.

The invention is illustrated by the following examples.

EXAMPLE 1

This example describes foamable polystyrene particles according to the invention and their use in the production of a foamed polystyrene according to the invention, and demonstrates the improvements obtained.

Foamable polystyrene particles in the form of spherical beads of average diameter 0.040 inch and containing a pentane blowing agent were tumbled for two minutes with 0.05% by weight of powdered anhydrous calcium chloride. 0.05% by weight of Span 40 (a commercial surface-active agent consisting essentially of sorbitan mono-palmitate) was then added in the form of a 25% by weight solution in 50/50 hexane/methylated spirit solvent and the mixture was blended in a conical blender for four minutes. The solvent was then removed by blowing air upwards through a bed of the treated beads in a hopper at room temperature.

The coated particles were then prefoamed in a continuous prefoaming apparatus and left to dry on an open tray for a day. Any tendency for the "prefoam" of foamed beads to stick together into clusters was noted. A "control" sample of uncoated beads and another of beads coated only with 0.05% by weight of Span 40 were each similarly foamed and dried. Each lot of particles was then molded into a block 8 feet x 4 feet x 2 feet using a standard commercial steam-molding apparatus and cut up into ceiling tiles each 1 foot square and ½ inch thick by means of an electrically heated spring-tensioned Nichrome wire.

It was found that 35% of the tiles made from the control sample of beads had to be rejected because large areas of their cut surfaces did not have the desirable raised bead peripheries that were uniformly present on the acceptable tiles, and a similarly unsatisfactory result was obtained with the tiles produced from the beads coated with Span 40 only; on the other hand only 5% of the tiles made from the beads coated with calcium chloride were unsatisfactory in this respect. It was also noted that although both lots of coated beads prefoamed easily with the formation of very few clusters, the con- It can therefore be seen that the foamable polystyrene which tended to jam the prefoaming apparatus.

It can therefore be seen that the foamable polystyrene according to the invention represented a considerable improvement over the beads that did not have a calcium chloride coating.

EXAMPLE 2

This example describes a further series of foamed polystyrene particles according to the invention and their use in the production of foamed polystyrene according to the invention and demonstrates the improvements obtained.

Several lots of foamable polystyrene particles were coated as in Example 1 with the substances noted in the table, the coated beads being converted to tiles as before and the appearance of the resulting tiles being noted.

| Coating (percentages by weight): | Tile appearance |
|---|---|
| 0.05 calcium chloride, 0.05 ricinoleamide (adhesive) | Good |
| 0.1 calcium chloride, 0.1 Span 40 (adhesive) | Good |
| None (control beads) | Poor |

These results demonstrate the improvement obtained using the particles according to the invention.

What is claimed is:

1. Foamable resin particles comprising a vinylaromatic polymer containing a volatile blowing agent; said particles having a coating comprising a deliquescent substance; said deliquescent substance:
    (A) comprising at least one salt of a mineral acid and
    (B) being adhered to said particles by means of an adhesive selected from the group consisting of amides of fatty acids containing 12–20 carbon atoms, esters of sorbitol, esters of sorbitan, oils, waxes and film-forming polymer latices.

2. Foamable resin particles according to claim 1, in which the resin is polystyrene.

3. Foamable resin particles according to claim 1, in which the volatile blowing agent is a hydrocarbon.

4. Foamable resin particles according to claim 1, wherein the resin is polystyrene and the deliquescent substance is calcium chloride.

5. Foamable resin particles according to claim 2, wherein the deliquescent substance is present in an amount between 0.02 and 0.1 percent by weight of the polystyrene.

6. A process for the production of a foamed vinylaromatic polymer having a good degree of uniformity of appearance when cut by a hot-wire technique, which comprises
   (A) preparing a prefoam of foamed beads by heating foamable resin particles comprising a vinylaromatic polymer containing a volatile blowing agent, said individual particles having a coating comprising a deliquescent substance thereon; said deliquescent substance:
      (1) comprising at least one salt of a mineral acid and
      (2) being adhered to said particles by means of an adhesive selected from the group consisting of amides of fatty acids containing 12–20 carbon atoms, esters of sorbitol, esters of sorbitan, oils, waxes and film-forming polymer latices;
   (B) treating the thus prepared prefoam with steam in a mold to produce the foamed resin and
   (C) cutting said foamed resin with a hot wire.

7. A foamed resin article having a good degree of uniformity of appearance when cut by a hot-wire technique, which comprises a multiplicity of consolidated foamed vinylaromatic polymer resin beads having at their interfaces a coating comprising a deliquescent substance; said deliquescent substance:
   (A) comprising at least one salt of a mineral acid and
   (B) being adhered to said beads by means of an adhesive selected from the group consisting of amides of fatty acids containing 12–20 carbon atoms, esters of sorbitol, esters of sorbitan, oils, waxes and film-forming polymer latices.

References Cited

UNITED STATES PATENTS

| | | | |
|---|---|---|---|
| 3,061,468 | 10/1962 | Tryon | 260—2.5FP |
| 3,300,437 | 1/1967 | Ferrigno | 260—2.5B |
| 3,304,274 | 2/1967 | Eng | 260—2.5B |
| 3,385,804 | 5/1968 | Hill, Jr. | 260—2.5B |

MURRAY TILLMAN, Primary Examiner

M. FOELAK, Assistant Examiner

U.S. Cl. X.R.

117—4, 16, 100; 83—171

UNITED STATES PATENT OFFICE
CERTIFICATE OF CORRECTION

Patent No. 3,553,114          Dated  January 5, 1971

Inventor(s)  Patrick V. Burt

It is certified that error appears in the above-identified patent and that said Letters Patent are hereby corrected as shown below:

Column 4, line 12, "wegiht" should read -- weight --; line 29, after "con-" insert -- trol beads formed numerous clusters of prefoamed beads which tended to jam the prefoaming apparatus. --; same column 4, cancel lines 30 and 31.

Signed and sealed this 1st day of June 1971.

(SEAL)
Attest:

EDWARD M. FLETCHER, JR.              WILLIAM E. SCHUYLER,
Attesting Officer                     Commissioner of Patent